(12) United States Patent
Hillenbrand

(10) Patent No.: US 9,551,289 B2
(45) Date of Patent: Jan. 24, 2017

(54) METHOD FOR PLAUSIBILIZING A RAIL PRESSURE SENSOR VALUE

(71) Applicant: Robert Bosch GmbH, Stuttgart (DE)

(72) Inventor: Tobias Hillenbrand, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 370 days.

(21) Appl. No.: 14/169,650

(22) Filed: Jan. 31, 2014

(65) Prior Publication Data
US 2014/0209068 A1  Jul. 31, 2014

(30) Foreign Application Priority Data

Jan. 31, 2013  (DE) .................. 10 2013 201 576

(51) Int. Cl.
| | | |
|---|---|---|
| *F02M 1/00* | (2006.01) | |
| *F02D 41/14* | (2006.01) | |
| *F02D 41/00* | (2006.01) | |
| *F02D 41/12* | (2006.01) | |
| *F02D 41/22* | (2006.01) | |

(52) U.S. Cl.
CPC ....... *F02D 41/1406* (2013.01); *F02D 41/0097* (2013.01); *F02D 41/222* (2013.01); *F02D 41/0025* (2013.01); *F02D 41/123* (2013.01); *F02D 2041/223* (2013.01); *F02D 2200/0602* (2013.01); *F02D 2200/0604* (2013.01); *Y02T 10/40* (2013.01)

(58) Field of Classification Search
CPC ...... F02D 41/3809; F02D 41/20; F02D 41/40; F02M 55/025
USPC ................ 123/456, 457, 445, 478, 479, 480
See application file for complete search history.

(56) References Cited

U.S. PATENT DOCUMENTS

| | | | | |
|---|---|---|---|---|
| 5,970,942 A | * | 10/1999 | Koeberlein | ........ F01M 11/0458 123/196 R |
| 6,213,080 B1 | * | 4/2001 | Marsh | ................ F01M 11/0458 123/196 R |
| 2003/0106534 A1 | * | 6/2003 | Wilson | .................. F02D 41/064 123/456 |
| 2003/0121501 A1 | * | 7/2003 | Barnes | ................ F02D 41/2422 123/446 |
| 2005/0151103 A1 | * | 7/2005 | Kubota | ............... F02D 41/3845 251/129.15 |
| 2006/0065242 A1 | * | 3/2006 | Nagai | ................. F02D 41/3863 123/458 |
| 2007/0051340 A1 | * | 3/2007 | Tsujimoto | ............. F02D 41/221 123/378 |

(Continued)

FOREIGN PATENT DOCUMENTS

| | | |
|---|---|---|
| DE | 10 2006 043 828 | 3/2008 |
| DE | 10 2008 043 413 | 5/2010 |

(Continued)

*Primary Examiner* — John Kwon
(74) *Attorney, Agent, or Firm* — Norton Rose Fulbright US LLP; Gerard Messina

(57) ABSTRACT

A method for plausibilizing a rail pressure sensor value of a rail pressure sensor of an internal combustion engine having a common rail system that has a fuel high-pressure piston delivery pump includes acquisition of the beginning of conveying by the piston delivery pump, calculation of the rail pressure from the compression work performed by the piston, and plausibilization of the rail pressure outputted by the rail pressure sensor on the basis of the calculated rail pressure.

11 Claims, 2 Drawing Sheets

(56) References Cited

U.S. PATENT DOCUMENTS

| | | | | |
|---|---|---|---|---|
| 2009/0326788 A1* | 12/2009 | Yuasa | ................. | F02D 41/3809 |
| | | | | 701/104 |
| 2011/0036329 A1* | 2/2011 | Jung | ................... | F02D 41/1497 |
| | | | | 123/456 |
| 2014/0067234 A1* | 3/2014 | Brown | ................ | F02D 41/3845 |
| | | | | 701/104 |

FOREIGN PATENT DOCUMENTS

| | | |
|---|---|---|
| EP | 0 976 921 | 2/2000 |
| EP | 1 305 508 | 5/2003 |

* cited by examiner

METHOD FOR PLAUSIBILIZING A RAIL PRESSURE SENSOR VALUE

CROSS REFERENCE

The present application claims the benefit under 35 U.S.C. §119 of German Patent Application No. DE 102013201576.3 filed on Jan. 31, 2013, which is expressly incorporated herein by reference in its entirety.

FIELD

The present invention relates to a method for plausibilizing a rail pressure sensor value of a rail pressure sensor of an internal combustion engine having a common rail system, having a camshaft-driven fuel high-pressure piston delivery pump. The subject matter of the present invention also relates to a computer program and a computer program product suitable for carrying out the method.

BACKGROUND INFORMATION

Modern diesel engines today standardly have so-called common rail systems that make it possible to inject the fuel into the combustion chambers of the internal combustion engine with very high precision under very high pressures. These common rail systems have rail pressure sensors that acquire the pressure in the rail. The pressure is supplied to a control device of the internal combustion engine as an input quantity. Such vehicles have on-board diagnostic systems that continuously acquire and record disturbances of the motor vehicle and of the internal combustion engine. In the field of these on-board diagnostic systems, in particular the OBD2 (On-Board Diagnostics II) systems, there is the legal requirement of monitoring the plausibility for example of data acquired by sensors. In a common rail system, the rail pressure sensor is generally used for two main functions. On the one hand, it is used to regulate the current rail pressure, and on the other hand it is used to determine the quantity of fuel that is to be injected into the combustion chamber. Due to the direct influencing of quantity, the rail pressure sensor is relevant to on-board diagnostics and must therefore be correspondingly monitored.

Various methods are available for the monitoring of the rail pressure sensor. German Patent Application No. DE 10 2006 043 828 A1 describes a method and a device for controlling an internal combustion engine, in particular an internal combustion engine having a common rail system, in which an actual value indicating the fuel pressure is acquired and is compared to a target value. On the basis of the comparison, a control quantity is specified for at least one actuator. A rail pressure quantity is determined on the basis of a quantity that characterizes an electrical quantity of the actuator.

German Patent Application No. DE 10 2008 043 413 A1 describes a method for plausibilizing an output signal of a rail pressure sensor of a direct-injecting internal combustion engine having a common rail system, in which an analog signal, characterizing the rail pressure, of the rail pressure sensor is supplied to a control device and processed in the control device. In this method, the rail pressure sensor outputs an additional digital signal that characterizes the rail pressure, and this additional signal is compared to the analog signal in the control device in order to plausibilize the analog signal that characterizes the rail pressure.

In addition, there exist so-called rail pressure sensor offset tests, which however have the disadvantage that a plausibilization is possible only at the zero point of the rail pressure sensor characteristic curve, and only at times before engine start or during after-running, when the rail pressure has been completely dismantled.

The rail pressure sensor can also work with the aid of a second rail pressure sensor whose acquired pressure data are compared to those of the first rail pressure sensor. However, such a solution requires a high technical outlay and is expensive.

SUMMARY

An example method according to the present invention for plausibilizing a rail pressure sensor value may have the advantage that only compression effects in the cylinder head of cam-driven or eccentric-driven fuel high-pressure piston delivery pumps are used for the plausibilization of the rail pressure sensor signal value. In this way, on the one hand no additional hardware need be provided, and on the other hand the example method covers the complete range of operation from 0 bar up to maximum pressure.

The present invention makes use of the knowledge that the compression work up to the opening of the high-pressure valve of a high-pressure delivery pump of a common rail system is proportional to the rail pressure. The compression work itself is proportional to the stroke of the piston of the piston pump, also referred to as the element piston. This stroke is in turn a function of the angle of the camshaft since the beginning of the compression. The camshaft in turn has a fixed transmission ratio to the crankshaft. In other words, the present invention uses known data of the piston pump for the determination of the rail pressure, and uses data that are already in use, and therefore read out, in a common rail system. The rail pressure determined in this way is then compared to the value measured by the rail pressure sensor and outputted, and in this way the rail pressure sensor value is plausibilized.

It is advantageously provided that the beginning of the conveying is determined through the temporal sampling of a camshaft rotational speed signal. This rotational speed signal is already being sampled and used for the controlling of the internal combustion engine, so that an additional hardware outlay, an additional software outlay, and an additional circuit device are not required.

The presence of the beginning of the conveying is assumed when the rotational speed signal reveals a discontinuity, in particular a kink.

The temporal run of the rotational speed signal is acquired using a high-resolution rotational speed sensor. The high-resolution rotational speed sensor is in particular fashioned so that it acquires a local tooth speed of a sensor wheel in the angular range of a pump cam.

In order to exclude disturbing influences, such as injections, on the kink of the local tooth speed at the opening time of the high-pressure valve, the recognition can take place during overrun operation with constant load.

The example method according to the present invention can be realized as a computer program and can be stored on a machine-readable carrier that the control device can read. In this way, retrofits of existing control devices are also possible, and here it is again very advantageous that such a retrofitting does not require additional hardware.

BRIEF DESCRIPTION OF THE DRAWINGS

Exemplary embodiments of the present invention are shown in the figures and are explained in more detail below.

DETAILED DESCRIPTION OF EXAMPLE EMBODIMENTS

Figure 1:
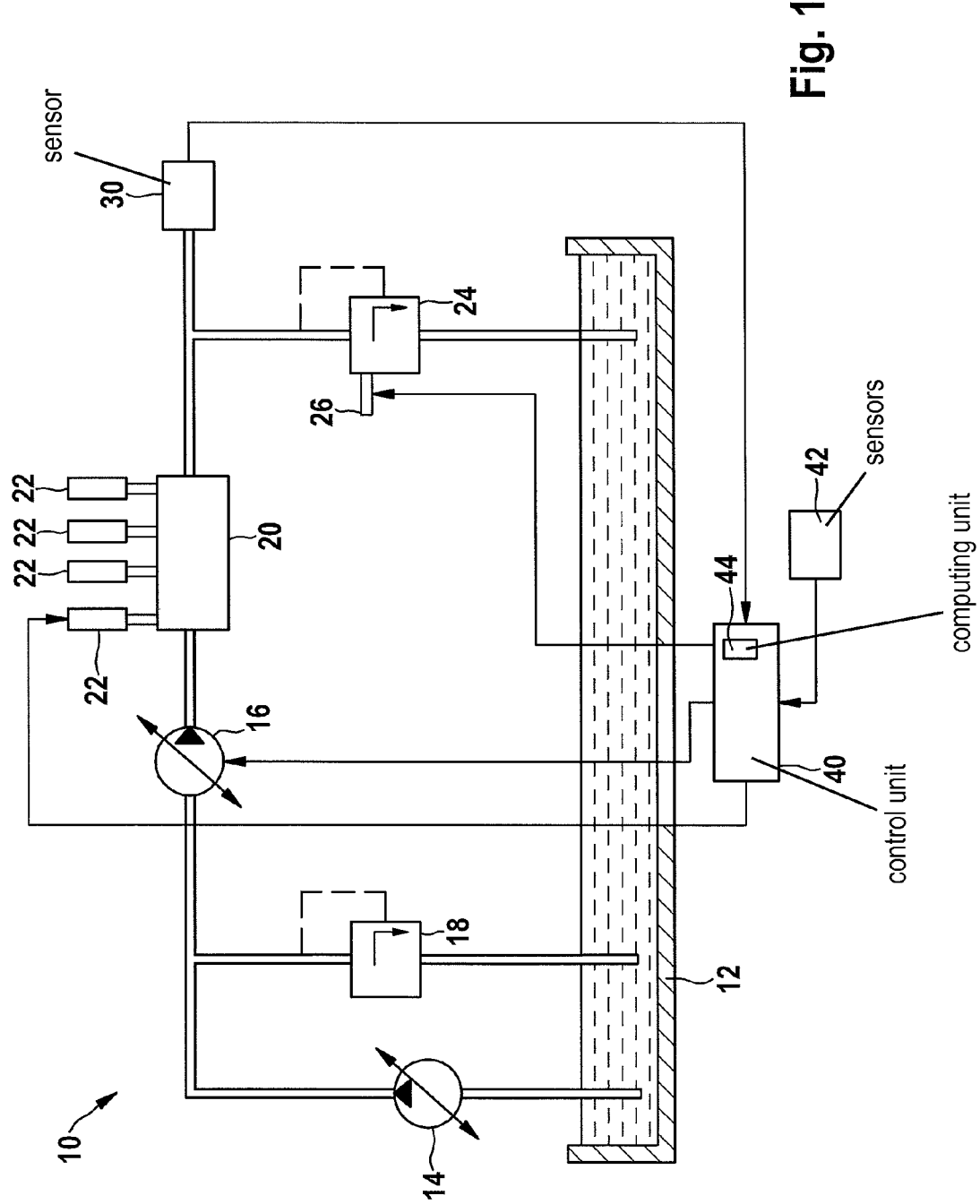
FIG. 1 shows a schematic representation of a fuel supply system of an internal combustion engine having a common rail system.

FIG. 1 shows, in a schematic representation, a fuel supply system 10 that is used in an internal combustion engine. The figure shows a fuel container 12, a pre-conveyor pump 14, a high-pressure pump 16, a low-pressure limiting valve 18, a fuel storage device 20 that is connected to various injectors 22, and a pressure regulating valve 24 via which fuel storage device 20 is connected to fuel container 12. Pressure regulating valve 24 can be controlled by a coil 26, and as a rule is constructed in such a way that, when it receives a control signal, it maintains a particular pressure in fuel storage device 20 and drains unneeded fuel into fuel container 12.

The lines between the output of high-pressure pump 16 and the input of pressure regulator valve 24 are designated the high-pressure region. In this region, the fuel is under high pressure. A sensor 30 is used to acquire the pressure in the high-pressure region. The lines between fuel container 12 and high-pressure pump 16 are designated the low-pressure region.

Various actuating elements, such as for example high-pressure pump 16, injectors 22, and pressure regulating valve 24, are acted on by a control unit 40. Here, control device 40 processes various signals of different sensors 42 that characterize the operating state of the internal combustion engine, such as a rotational speed sensor. In control unit 40, there is provided a computing unit 44 for carrying out the method presented.

During operation, the fuel is conveyed, by pre-conveyor pump 14, from fuel container 12 to high-pressure pump 16. If the pressure in the low-pressure region increases to excessively high values, then low-pressure valve 18 opens and releases the connection between the output of pre-conveyor pump 14 and fuel container 12. High-pressure pump 16 conveys the fuel from the low-pressure region into the high-pressure region, and builds up a high pressure in fuel storage device 20. In externally ignited internal combustion engines, typical values are between 30 and 100 bar. In self-igniting internal combustion engines, i.e., diesel engines, values between 1000 and 2000 bar are reached.

Sensor 30 acquires the pressure in fuel storage device 20, also called the rail, or in the overall high-pressure region. The controllable high-pressure pump 16 and the pressure regulating valve are used to regulate the pressure.

Vehicles that have such common rail systems are equipped with OBD systems. Such on-board diagnostic systems (OBD2) record disturbances and errors during operation of the internal combustion engine and of the vehicle. The recorded disturbances are stored in a storage device and can be read out later. In OBD2 legislation, it is a legal requirement that the measurement values of sensor 30, also referred to as the rail pressure sensor and referred to as such hereinafter, be plausibilized in the entire operating pressure range. This can be accomplished with the aid of a further pressure sensor in the high-pressure region. However, such a second pressure sensor may be undesirable due to the additional technical outlay, susceptibility to failure, and not least due to the additional costs that result. The example method described below avoids such an additional pressure sensor, and links the sensors in the internal combustion engine, having functions of control unit 40, also called the control device, or software functions of computing unit 44, with one another in such a way that it can be unambiguously determined whether the actual rail pressure value and the rail pressure measurement value outputted by rail pressure sensor 30 agree with one another. In this way, a plausibilization is possible of the measurement value of rail pressure sensor 30.

Figure 2:
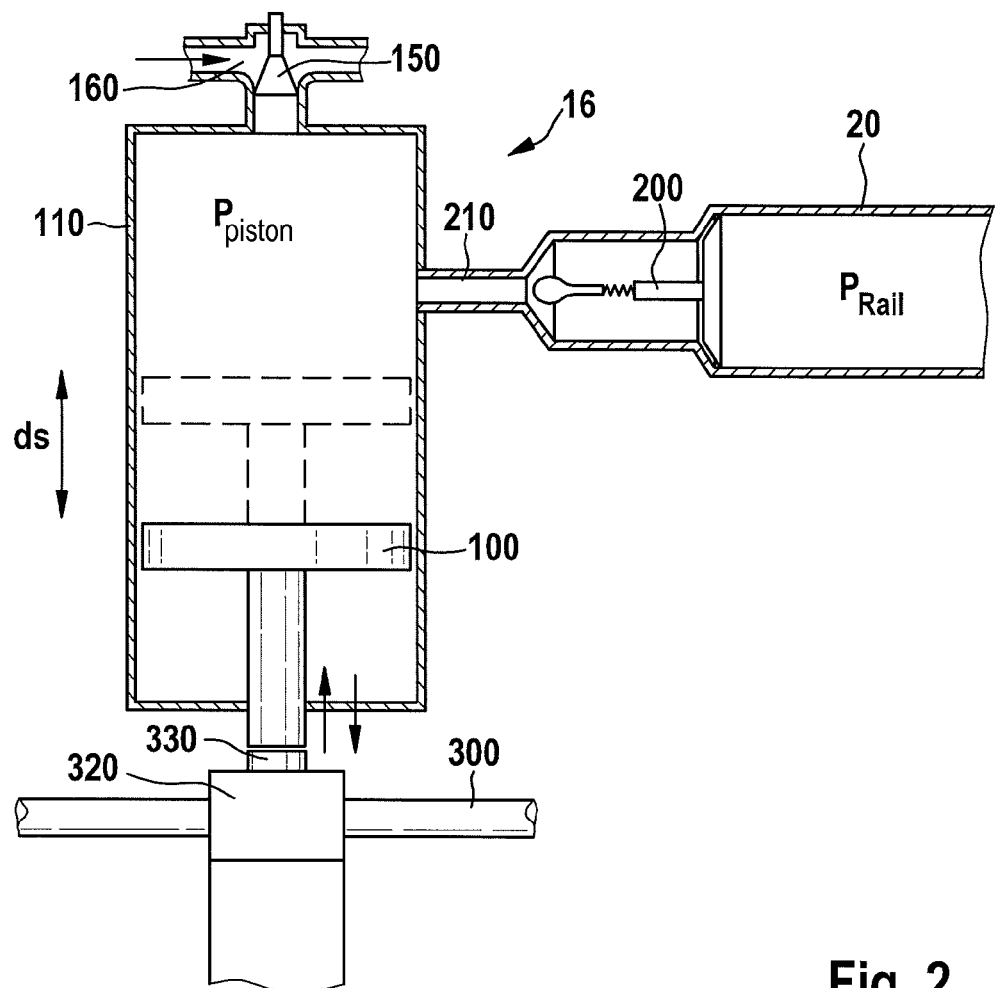
FIG. 2 schematically shows a fuel high-pressure piston delivery pump for the explanation of the method according to the present invention.

FIG. 2 schematically shows a high-pressure pump 16 realized as a piston delivery pump. The so-called element piston 100 is driven by a camshaft 300, on which there are situated for this purpose a corresponding cam 320 and a roller 330. The rotational movement of camshaft 300 is converted into a translational movement of piston 100 in a conventional manner. On the upper side of a cylinder 110 in which piston 100 runs back and forth there is situated a valve 150 that enables the supply of fuel from the low-pressure circuit, i.e., the corresponding low-pressure line 160. Likewise, in the upper region of cylinder 110 there is situated a high-pressure line 210 as well as a high-pressure valve 200 that, when a specified pressure is exceeded, creates a connection to rail 20. The downward movement of piston 100 results, via intake valve 150, in a suctioning of fuel from the low-pressure circuit, and the upward movement results in a compression of the previously suctioned fuel. The fuel compressed during the compression phase is conveyed into rail 20 via high-pressure line 210 and high-pressure valve 200.

Figure 3:
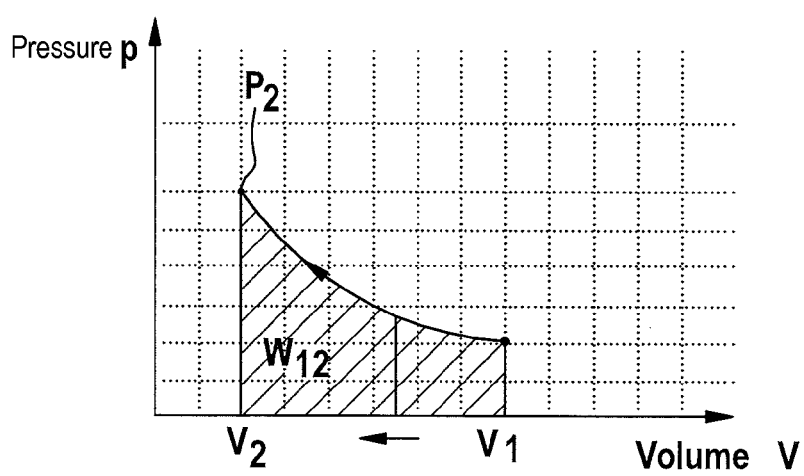
FIG. 3 shows the pressure over the volume during a stroke process of the delivery pump shown in FIG. 2.

During the compression, for example from volume $V_1$ to volume $V_2$ (see FIG. 3), compression work $W_{12}$ is performed. Path ds here corresponds to the compression stroke of element piston 100. The compression is an approximately adiabatic process. As is shown in FIG. 3, the surface under the adiabatic curve from $V_1$ to $V_2$ corresponds to compression work $W_{12}$ that has to be performed by element piston 100. As soon as the pressure in element piston 100 $p_{Kolben}$ is greater than the pressure in the rail $p_{Rail}$, there takes place a release of tension. The compressed fuel is then conveyed from the element chamber into rail 20. This causes the pressure in the element chamber to decrease, while the pressure in rail 20 increases. The compression work up to the opening of high-pressure valve 200 ($p_{Kolben}=p_{Rail}$) is here proportional to rail pressure $p_{Rail}$. The greater the rail pressure is, the more compression work has to be performed by element piston 100. The compression work itself is in turn proportional to the stroke ds of element piston 100. This in turn is a function of the angle φ of the camshaft since the beginning of the compression ($\varphi_{Nocken\_Beginn}$), which in turn has a fixed transmission ratio to the crankshaft.

The time of opening of high-pressure valve 200, i.e., when $p_{Kolben}=p_{Rail}$, is therefore the endpoint of the increase of the compression work. In FIG. 3, this corresponds to point $P_2$ at $V_2$ on the adiabatic curve.

The time of opening of high-pressure valve 200 can now be detected via a discontinuity, for example a kink, in the rotational speed signal, which is acquired anyway, of the crankshaft. For this purpose, on the crankshaft (not shown) there is situated a conventional rotational speed sensor, for example a toothed rotary sensor, and a sensor that acquires the tooth position. Because the compression work ultimately has to be applied by the crankshaft, the kink can be determined by the rotational speed sensor on the basis of a high-resolution scanning that acquires the local tooth speed in the angular region of the pump cam.

As a result, it is possible to determine the stroke ds of element piston 100 as a function of $\phi_{Nocken\_Beginn}$ to $\phi_{Nocken\_Förderung}$, where angular position $\phi_{Nocken\_Förderung}$ is the camshaft position that corresponds to the opening of high-pressure valve 200.

The pressure in the element chamber, i.e., in cylinder 110, can be determined from the known compression stroke ds and the concomitant change in volume, using the following equation:

$$\frac{\Delta V}{V} = -\kappa \cdot \Delta p,$$

where κ designates the compressibility of the fuel. Alternatively, the compression characteristic of the fuel can also be stored in a characteristic field, so that influences of the fuel temperature can also be taken into account.

The current rail pressure $p_{Rail}$ corresponds in the result to the element pressure, i.e., to the pressure in the piston at the time of opening of high-pressure valve 200. It is proportional to the change in volume $\Delta V = V_2 - V_1$.

In order to exclude disturbing influences such as injections on the kink of the local tooth speed at the time of opening of the high-pressure valve, the recognition can be carried out during overrun at constant load.

An advantage of the example method described above is that it covers the complete operating range from 0 bar up to $p_{max}$. The example method is suitable both for systems having a pressure regulating valve and for systems not having such a valve.

The example method described above can be implemented as a computer program and can run in computing unit 44 of control unit 40. No additional hardware, in particular no additional sensors, is required for the execution of the method; rather, the crankshaft signal is evaluated and only the dimension of the piston pump has to be known; because of this the method can thus be retrofitted at anytime. For this purpose, it is preferably stored on a data carrier that can be read in by computing unit 44 of the control unit or of control device 40.

What is claimed is:

1. A method for plausibilizing a rail pressure sensor value that is output by a rail pressure sensor of an internal combustion engine, the internal combustion engine being part of a common rail system that includes a fuel high-pressure piston delivery pump and a common rail, the method comprising:
   obtaining, by processing circuitry, an indication of when conveyance of fuel by the piston delivery pump into the common rail begins;
   calculating, by the processing circuitry, a pressure in the common rail based on the obtained indication; and
   plausibilizing, by the processing circuitry, the rail pressure sensor value that is output by the rail pressure sensor by comparing the rail pressure sensor value to the calculated rail pressure.

2. The method as recited in claim 1, wherein the beginning of conveying is obtained by temporally scanning a rotational speed signal of a crankshaft of a piston of the fuel high-pressure piston delivery pump.

3. The method as recited in claim 2, wherein the beginning of conveying is obtained by determining, based on the scanning of the rotational speed signal, when the rotational speed signal shows a kink.

4. The method as recited in claim 2, wherein the rotational speed signal is acquired using a high-resolution rotational speed sensor.

5. The method as recited in claim 4, wherein the high-resolution rotational speed sensor acquires a local tooth speed in an angular range of a pump cam.

6. The method as recited in claim 1, wherein the method is carried out during overrun operation of a vehicle with constant load.

7. A non-transitory machine-readable storage medium storing a computer program that is executable by a control device of an internal combustion engine, and that, when executed by the control device, causes the control device to perform a method for plausibilizing a rail pressure sensor value that is output by a rail pressure sensor of the internal combustion engine, the internal combustion engine being part of a common rail system that includes a fuel high-pressure piston delivery pump and a common rail, the method comprising:
   obtaining an indication of when conveyance of fuel by the piston delivery pump into the common rail begins;
   calculating a pressure in the common rail based on the obtained indication; and
   plausibilizing the rail pressure sensor value that is output by the rail pressure sensor by comparing the rail pressure sensor value to the calculated rail pressure.

8. The method as recited in claim 1, further comprising determining a compression work performed by a piston of the piston delivery pump based on the obtained indication, wherein the calculation is performed based on the determined compression work.

9. The method as recited in claim 1, further comprising determining a length of a stroke of a piston of the piston delivery pump based on the obtained indication, wherein the calculation is performed based on the determined length of the stroke.

10. A method for plausibilizing a rail pressure sensor value that is output by a rail pressure sensor of a common rail system that includes the rail pressure sensor, an internal combustion engine, a fuel high-pressure piston delivery pump, and a common rail, the method comprising:
   obtaining, by processing circuitry, an indication of at least one of (a) a measurement of a compression of volume performed by a piston of the fuel high-pressure piston delivery pump from a beginning of a compression phase until when the fuel high-pressure piston delivery pump begins to convey fuel into the common rail, (b) a compression work performed from the beginning of the compression phase until when the fuel high-pressure piston delivery pump begins to convey fuel into the common rail, (c) a length of a translational stroke of the piston from the beginning of the compression phase until when the fuel high-pressure piston delivery pump begins to convey fuel into the common rail, and (d) a rotational movement of a camshaft of the fuel high-pressure piston delivery pump from the beginning of the compression phase until when the fuel high-pressure piston delivery pump begins to convey fuel into the common rail;
   calculating, by the processing circuitry, a pressure in the common rail based on the obtained indication;
   comparing, by the processing circuitry, the rail pressure sensor value that is output by the rail pressure sensor to the calculated rail pressure; and
   determining a plausibility of the rail pressure sensor value that is output by the rail pressure sensor based on a result of the comparison.

11. The method of claim 10, further comprising:
scanning a rotational speed signal indicating a rotational speed of a crankshaft;
identifying a kink in the signal; and
determining when the fuel high-pressure piston delivery pump begins to convey fuel into the common rail based on the identified kink, wherein the determined beginning is used for the obtaining step.

* * * * *